US012313098B2

(12) United States Patent
Kondo et al.

(10) Patent No.: US 12,313,098 B2
(45) Date of Patent: May 27, 2025

(54) HYDRAULIC PUMP PERFORMANCE DETERIORATION DETECTION SYSTEM

(71) Applicant: KAWASAKI JUKOGYO KABUSHIKI KAISHA, Kobe (JP)

(72) Inventors: Akihiro Kondo, Kobe (JP); Yousuke Kataoka, Kobe (JP); Jun Umekawa, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 40 days.

(21) Appl. No.: 18/242,271

(22) Filed: Sep. 5, 2023

(65) Prior Publication Data

US 2024/0077092 A1 Mar. 7, 2024

(30) Foreign Application Priority Data

Sep. 2, 2022 (JP) ................................ 2022-139664

(51) Int. Cl.
*F15B 19/00* (2006.01)
*F15B 21/08* (2006.01)

(52) U.S. Cl.
CPC ............ *F15B 19/005* (2013.01); *F15B 21/08* (2013.01); *F15B 2211/45* (2013.01);
(Continued)

(58) Field of Classification Search
CPC ...... F15B 19/005; F15B 20/004; F15B 21/08; F15B 2211/45; F15B 2211/6309;
(Continued)

(56) References Cited

U.S. PATENT DOCUMENTS 5,563,351 A 10/1996 Miller
2004/0261608 A1* 12/2004 Bugel .................... G05B 19/43
91/465

(Continued)

FOREIGN PATENT DOCUMENTS

JP H07-280688 A 10/1995

OTHER PUBLICATIONS

U.S. Appl. No. 18/241,312, filed Sep. 1, 2023 in the name of Akihiro Kondo et al.

(Continued)

*Primary Examiner* — Matthew Wiblin
(74) *Attorney, Agent, or Firm* — Oliff PLC

(57) ABSTRACT

A hydraulic pump performance deterioration detection system according to one embodiment includes: a hydraulic pump that is driven by a prime mover and that supplies a hydraulic liquid to a hydraulic actuator to move the hydraulic actuator; a switching valve located on a passage through which the hydraulic liquid delivered from the hydraulic pump flows, the switching valve being switchable between an open position and a closed position; and control circuitry configured to change a rotation speed of the prime mover. When the hydraulic actuator is not moving, in a state where the switching valve is switched to the closed position, the control circuitry determines whether or not performance of the hydraulic pump has deteriorated based on the rotation speed of the prime mover and a delivery pressure of the hydraulic pump measured by a pressure sensor.

14 Claims, 5 Drawing Sheets

(52) U.S. Cl.
CPC ................. *F15B 2211/6309* (2013.01); *F15B 2211/633* (2013.01); *F15B 2211/6651* (2013.01); *F15B 2211/6652* (2013.01)

(58) Field of Classification Search
CPC ........ F15B 2211/633; F15B 2211/6651; F15B 2211/6652; F15B 2211/8633; F15B 2211/87
See application file for complete search history.

(56) References Cited

U.S. PATENT DOCUMENTS

| | | | | |
|---|---|---|---|---|
| 2005/0022589 | A1* | 2/2005 | Du | F15B 19/005 702/114 |
| 2016/0091004 | A1* | 3/2016 | Gomm | F15B 11/10 60/431 |
| 2022/0298755 | A1* | 9/2022 | Udagawa | F04B 49/10 |

OTHER PUBLICATIONS

U.S. Appl. No. 18/381,500, filed Oct. 18, 2023 in the name of Akihiro Kondo et al.
Aug. 14, 2024 Office Action issued in U.S. Appl. No. 18/381,500.
Aug. 14, 2024 Office Action issued in U.S. Appl. No. 18/241,312.

* cited by examiner

HYDRAULIC PUMP PERFORMANCE DETERIORATION DETECTION SYSTEM

CROSS-REFERENCE TO RELATED APPLICATION

This application claims priority to and the benefit of Japanese Patent Application No. 2022-139664, filed on Sep. 2, 2022, the entire disclosure of which is incorporated herein by reference.

BACKGROUND OF THE INVENTION

Field of the Invention

The present disclosure relates to a system for detecting performance deterioration of a hydraulic pump.

Description of the Related Art

Conventionally, a hydraulic circuit that supplies a hydraulic liquid from a hydraulic pump to a hydraulic actuator has been known. In such a hydraulic circuit, it is desired to detect performance deterioration of the hydraulic pump.

For example, Japanese Laid-Open Patent Application Publication No. H07-280688 discloses an apparatus that measures a drain flow rate from a hydraulic pump by a flowmeter and that determines based on the drain flow rate whether or not the hydraulic pump is worn.

SUMMARY OF THE INVENTION

However, since the drain flow rate is a slight flow rate, the measurement value of the flowmeter is readily affected by the measurement precision thereof. Therefore, based on the drain flow rate measured by the flowmeter, it is difficult to detect performance deterioration of the hydraulic pump, such as to detect a minute decrease in the delivery flow rate of the hydraulic pump due to wear of a sliding component of the hydraulic pump.

In view of the above, an object of the present disclosure is to provide a hydraulic pump performance deterioration detection system that is capable of detecting performance deterioration of a hydraulic pump without using a flowmeter.

In one aspect, the present disclosure provides a hydraulic pump performance deterioration detection system including: a hydraulic pump that is driven by a prime mover and that supplies a hydraulic liquid to a hydraulic actuator to move the hydraulic actuator; a switching valve located on a passage through which the hydraulic liquid delivered from the hydraulic pump flows, the switching valve being switchable between an open position in which the switching valve opens the passage and a closed position in which the switching valve blocks the passage; control circuitry configured to change a rotation speed of the prime mover; and a pressure sensor that measures a delivery pressure of the hydraulic pump at a position upstream of the switching valve. When the hydraulic actuator is not moving, in a state where the switching valve is switched to the closed position, the control circuitry determines whether or not performance of the hydraulic pump has deteriorated based on the rotation speed of the prime mover and the delivery pressure of the hydraulic pump measured by the pressure sensor.

In another aspect, the present disclosure provides a hydraulic pump performance deterioration detection system including: a hydraulic pump that is driven by a prime mover and that supplies a hydraulic liquid to a hydraulic actuator to move the hydraulic actuator; a switching valve located on a passage through which the hydraulic liquid delivered from the hydraulic pump flows, the switching valve being switchable between an open position in which the switching valve opens the passage and a particular restrictive position in which an opening degree of the switching valve is within a range of 1 to 70%; control circuitry configured to change a rotation speed of the prime mover; and a pressure sensor that measures a delivery pressure of the hydraulic pump at a position upstream of the switching valve. When the hydraulic actuator is not moving, in a state where the switching valve is switched to the particular restrictive position, the control circuitry determines whether or not performance of the hydraulic pump has deteriorated based on the rotation speed of the prime mover and the delivery pressure of the hydraulic pump measured by the pressure sensor.

According to the present disclosure, performance deterioration of a hydraulic pump can be detected without using a flowmeter.

DETAILED DESCRIPTION

Embodiment 1

Figure 1:
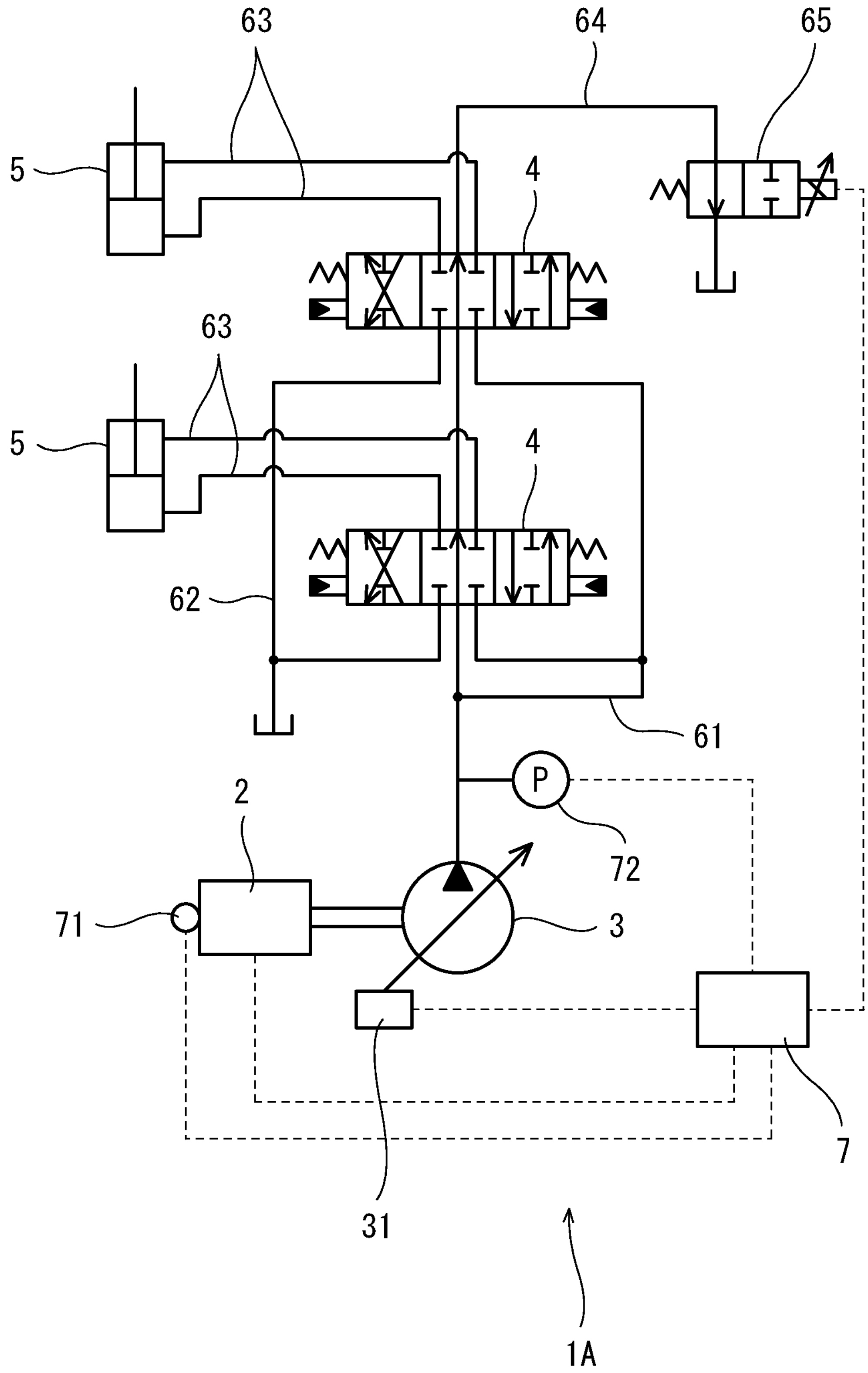
FIG. 1 shows a schematic configuration of a hydraulic pump performance deterioration detection system according to Embodiment 1.

FIG. 1 shows a hydraulic pump performance deterioration detection system 1A according to Embodiment 1. The present embodiment is configured so that performance deterioration of a hydraulic pump 3 can be detected, for example, with a hydraulic circuit of a construction machine. The construction machine is, for example, a hydraulic excavator or a hydraulic crane.

The hydraulic pump 3 is driven by a prime mover 2. In the present embodiment, the prime mover 2 is an engine. Alternatively, the prime mover 2 may be an electric motor. Also, in the present embodiment, the hydraulic pump 3 is an axial piston pump (a swash plate pump or a bent axis pump). Alternatively, the hydraulic pump 3 may be a different type of pump, such as a vane pump, a gear pump, or a screw pump.

Further, in the present embodiment, the hydraulic pump 3 is a variable displacement pump. The displacement of the hydraulic pump 3 (i.e., the amount of liquid delivered per rotation of the pump 3) is changed by a regulator 31. The displacement of the hydraulic pump 3 is arbitrarily changeable within a range between a minimum displacement and a maximum displacement. In the present embodiment, the minimum displacement of the hydraulic pump 3 is set to be greater than zero. Alternatively, the minimum displacement of the hydraulic pump 3 may be set to zero. The regulator 31 moves in accordance with an electrical signal.

For example, in a case where the hydraulic pump 3 is a swash plate pump, the regulator 31 may electrically change a hydraulic pressure applied to a servo piston coupled to the swash plate of the hydraulic pump 3, or may be an electric actuator coupled to the swash plate of the hydraulic pump 3.

The hydraulic pump 3 supplies a hydraulic liquid to hydraulic actuators 5 via control valves 4 to move the hydraulic actuators 5. In the illustrated example, the number of hydraulic actuators 5 is two. Alternatively, the number of hydraulic actuators 5 may be one (in this case, the number of control valves 4 is also one), or may be three or more.

The hydraulic pump 3 is connected to the control valves 4 by a supply passage 61. Specifically, the supply passage 61 includes: a shared passage extending from the hydraulic pump 3; and branch passages branched off from the shared passage and connected to the respective control valves 4. The control valves 4 are connected to a tank by a tank passage 62. A relief passage is branched off from the shared passage of the supply passage 61, and a relief valve is located on the relief passage.

In the present embodiment, each of the hydraulic actuators 5 is a double-acting cylinder or hydraulic motor that moves bi-directionally. Accordingly, each of the control valves 4 is connected to a corresponding one of the hydraulic actuators 5 by a pair of supply/discharge passages 63.

Each control valve 4 is, for example, a spool valve including a spool therein. Each control valve 4 is switchable between a neutral position, a first acting position, and a second acting position. When in the neutral position, each control valve 4 blocks all of the following passages: the supply passage 61; the tank passage 62; and the pair of supply/discharge passages 63. When in the first acting position or the second acting position, each control valve 4 allows the supply passage 61 to communicate with one of the supply/discharge passages 63, and allows the other supply/discharge passage 63 to communicate with the tank passage 62.

Each control valve 4 moves in accordance with an operating amount of a corresponding one of operators that is operated to move the hydraulic actuator 5 corresponding to the control valve 4. In the present embodiment, each control valve 4 includes a pair of pilot ports. In a case where each operator is an electrical joystick, a pair of solenoid proportional valves are connected to the pair of pilot ports of each control valve 4, respectively. Each control valve 4 is controlled by the control circuitry 7 via these solenoid proportional valves.

In accordance with increase in the operating amount of each operator, the control circuitry 7 increases the amount of movement (i.e., opening area) of the corresponding control valve 4. Also, the control circuitry 7 controls the regulator 31 to increase the displacement of the hydraulic pump 3 in accordance with increase in the operating amount of the operator.

In a case where each operator is a pilot operation valve that outputs a pilot pressure in accordance with its operating amount, the pair of pilot ports of the corresponding control valve 4 are connected to the pilot operation valve. Alternatively, each control valve 4 may be a solenoid valve that is directly controlled by the control circuitry 7.

Regarding the control circuitry 7, the functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

An unloading passage 64 is branched off from the shared passage of the supply passage 61, and the unloading passage 64 extends to the tank. In the present embodiment, the unloading passage 64 doubles as a center bypass passage that passes through all the control valves 4.

When in the neutral position, each control valve 4 opens the unloading passage 64 (with the opening degree of the control valve 4 being 100%). In accordance with increase in the amount of movement of the control valve 4 from the neutral position, the opening degree of the control valve 4 for the unloading passage 64 decreases, and at least when the amount of movement from the neutral position is at its maximum, the control valve 4 blocks the unloading passage 64 (with the opening degree of the control valve 4 being 0%). That is, unless any of the control valves 4 blocks the unloading passage 64 or a below-described unloading valve 65 blocks the unloading passage 64, the hydraulic liquid delivered from the hydraulic pump 3 flows into the unloading passage 64.

On the unloading passage 64, the unloading valve 65 is located at a position downstream of all the control valves 4. The unloading valve 65 is switchable between an open position and a closed position. When in the open position, the unloading valve 65 opens the unloading passage 64 (with the opening degree of the unloading valve 65 being 100%). When in the closed position, the unloading valve 65 blocks the unloading passage 64 (with the opening degree of the unloading valve 65 being 0%). The opening degree of the unloading valve 65 is arbitrarily changeable within a range between the open position and the closed position. In the present embodiment, the open position is the neutral position. Alternatively, the closed position may be the neutral position.

In the present embodiment, the unloading valve 65 is a spool valve that includes a spool therein. That is, the open position, which is the neutral position, is one stroke end of the spool, and the closed position is the other stroke end of the spool. In other words, in the neutral position, the spool is pressed against a stopper by a spring, whereas in the closed position, the spool is farthest from the stopper (i.e., full stroke).

In the present embodiment, the unloading valve 65 is a solenoid valve including a solenoid, and is controlled by the control circuitry 7. That is, the aforementioned neutral position is the non-excitation state of the solenoid. In accordance with increase in the operating amount of the aforementioned operator(s), the control circuitry 7 decreases the opening degree of the unloading valve 65. The unloading valve 65 may include not the solenoid but a pilot port, and the pilot port may be connected to a solenoid valve that is a separate valve from the unloading valve 65. In this case, the unloading valve 65 is controlled by the control circuitry 7 via the solenoid valve.

The control circuitry 7 is configured to change the rotation speed of the prime mover 2. In the present embodiment, since the prime mover 2 is an engine, the control circuitry 7 controls the amount of fuel injection. The control circuitry 7 may be divided into engine controlling circuitry and pump controlling circuitry. The engine controlling circuitry controls the amount of fuel injection, and the pump controlling circuitry controls the regulator 31.

The control circuitry 7 is electrically connected to a rotation speed meter 71 located on the prime mover 2 and to a pressure sensor 72 located on the shared passage of the supply passage 61. The rotation speed meter 71 measures the rotation speed of the prime mover 2, and the pressure sensor 72 measures the delivery pressure of the hydraulic pump 3. As previously described, since the unloading passage 64 is branched off from the shared passage of the supply passage 61, the pressure sensor 72 measures the delivery pressure of the hydraulic pump 3 at a position upstream of the unloading valve 65.

The control circuitry 7 performs a performance check on the hydraulic pump 3 when the hydraulic actuators 5 are not moving, i.e., when the hydraulic pump 3 is not supplying the hydraulic liquid to any of the hydraulic actuators 5.

To be more specific, the control circuitry 7 first controls the regulator 31 to minimize the displacement of the hydraulic pump 3. Normally, when the hydraulic actuators 5 are not moving, the displacement of the hydraulic pump 3 is kept to the minimum, and for this reason, the control circuitry 7 will not give any new operational instructions to the regulator 31.

Then, the control circuitry 7 adjusts the rotation speed of the prime mover 2 to a relatively low predetermined value Ns. For example, in a case where the rotation speed of the prime mover 2 at a normal time is kept constant within the range of 1000 to 2500 rpm, the predetermined value Ns may be a value that is lower than the rotation speed of the prime mover 2 at a normal time (e.g., 900 to 1800 rpm).

Thereafter, the control circuitry 7 switches the unloading valve 65 to the closed position. Consequently, the delivery of the hydraulic liquid from the hydraulic pump 3 is blocked unless the delivery pressure of the hydraulic pump 3 exceeds the setting pressure of the relief valve (i.e., exceeds the relief pressure).

In a state where the delivery of the hydraulic liquid from the hydraulic pump 3 is blocked, when the rotation speed of the prime mover 2 is relatively low, such as the predetermined value Ns, the delivery pressure of the hydraulic pump 3 does not become so high due to factors such as internal leakage of the hydraulic pump 3 (in the present embodiment, the factors also include leakage of the control valve(s) 4).

In this state, the control circuitry 7 determines whether or not the performance of the hydraulic pump 3 has deteriorated based on the rotation speed of the prime mover 2 measured by the rotation speed meter 71 and the delivery pressure of the hydraulic pump 3 measured by the pressure sensor 72. This determination is performed in a state where the regulator 31 is, as mentioned above, controlled to minimize the displacement of the hydraulic pump 3.

Figure 2:
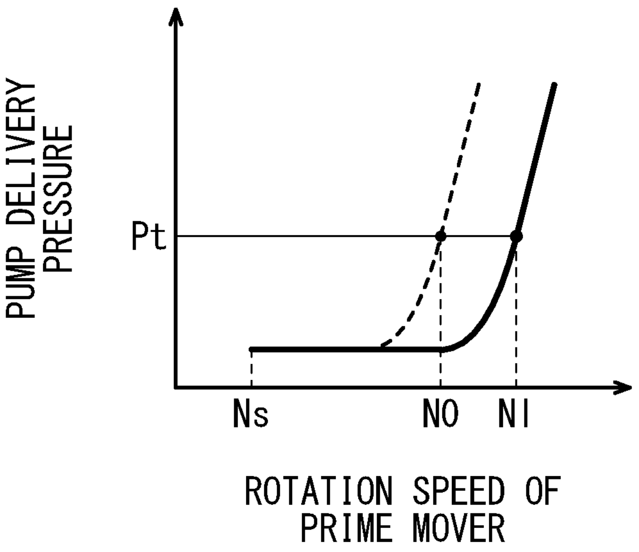
FIG. 2 is a graph showing a relationship between a rotation speed of a prime mover and a delivery pressure of a hydraulic pump.

To be more specific, as shown in FIG. 2, the control circuitry 7 increases the rotation speed of the prime mover 2 from the predetermined value Ns, and when the delivery pressure of the hydraulic pump 3 measured by the pressure sensor 72 has become a threshold value Pt, in other words, when the delivery pressure of the hydraulic pump 3 has increased to the threshold value Pt, the control circuitry 7 stores the rotation speed at the time as a determination-use rotation speed N1.

The control circuitry 7 prestores a reference rotation speed N0. The reference rotation speed N0 is the rotation speed obtained when the delivery pressure of the hydraulic pump 3 has become the threshold value Pt in a case where there is no abnormality in the hydraulic pump 3 (e.g., after hydraulic drive equipment including the hydraulic pump 3 is mounted to a machine and has been operated for a short period of time but before the shipment of the machine from the factory; or shortly after the fully assembled machine is shipped from the factory and after the hydraulic drive equipment has been operated only for a short period of time). The reference rotation speed N0 may be the rotation speed obtained when the delivery pressure of the hydraulic pump 3 has become the threshold value Pt in a case where a performance check is more simply performed on the hydraulic pump 3 alone.

The control circuitry 7 compares the stored determination-use rotation speed N1 with the reference rotation speed N0. In a case where the determination-use rotation speed N1 is greater than the reference rotation speed N0 by at least a setting value V (N1−N0≥V), the control circuitry 7 determines that the performance of the hydraulic pump 3 has deteriorated. On the other hand, in a case where the determination-use rotation speed N1 is not greater than the reference rotation speed N0 by at least the setting value V (N1−N0<V), the control circuitry 7 determines that the performance of the hydraulic pump 3 has not deteriorated.

In a case where the rotation speed of the prime mover 2 is increased from the relatively low predetermined value Ns, the rotation speed at which the delivery pressure of the hydraulic pump 3 becomes the threshold value Pt varies depending on the degree of an abnormality in the hydraulic pump 3 (e.g., in a case where the hydraulic pump 3 is a swash plate pump, examples of the abnormality therein include: wear of a shoe on the distal end of a piston, the shoe sliding on the swash plate; and wear of a sliding surface between a valve plate and a cylinder block). Therefore, by using the rotation speed of the prime mover 2 and the delivery pressure of the hydraulic pump 3 as in the present embodiment, performance deterioration of the hydraulic pump 3 can be detected without using a flowmeter, and in addition, performance deterioration of the hydraulic pump 3 can be detected with a higher precision than in a case where the performance deterioration detection is performed by measuring a drain flow rate.

It is often the case that the hydraulic circuit of a construction machine includes: the unloading passage 64, on which the unloading valve 65 is located; and the pressure sensor 72, which measures the delivery pressure of the hydraulic pump 3. Such a hydraulic circuit makes it possible to detect performance deterioration of the hydraulic pump 3 without requiring additional device installation. Moreover, the measurement is performed including not only the leakage of the pump in the hydraulic drive equipment but also other slight leakages. That is, not only is the internal leakage of the pump alone paid attention to, but the measurement can be performed including the influence of the control valves 4 and so forth in the hydraulic circuit. This makes it possible to make a precise determination on the performance deterioration of the pump without being affected by the individual difference of the machine.

Further, in the present embodiment, the rotation speed of the prime mover 2 is increased from the predetermined value Ns after the displacement of the hydraulic pump 3 is minimized. Accordingly, the difference between the determination-use rotation speed N1 and the reference rotation speed N0 when the performance of the hydraulic pump 3 has deteriorated is great, which makes it possible to improve the precision of the detection of performance deterioration of the hydraulic pump 3.

<Variations>

In the above-described embodiment, at the time of storing, as the determination-use rotation speed N1, the rotation speed of the prime mover 2 when the delivery pressure of the hydraulic pump 3 has become the threshold value Pt, the control circuitry 7 increases the rotation speed of the prime mover 2 from the relatively low predetermined value Ns. Conversely, the control circuitry 7 may decrease the rotation speed of the prime mover 2 from a relatively high predetermined value, and when the delivery pressure of the hydraulic pump 3 measured by the pressure sensor 72 has decreased to the threshold value Pt, the control circuitry 7 may store the rotation speed at the time as the determination-use rotation speed N1. Also in the case of decreasing the rotation speed of the prime mover 2 from the relatively high predetermined value, the rotation speed at which the delivery pressure of the hydraulic pump 3 becomes the threshold value Pt varies depending on the degree of an abnormality in the hydraulic pump 3. Therefore, also in this case, by using the rotation speed of the prime mover 2 and the delivery pressure of the hydraulic pump 3, performance deterioration of the hydraulic pump 3 can be detected without using a flowmeter. Further, also in the case of decreasing the rotation speed of the prime mover 2 from the relatively high predetermined value, if the rotation speed of the prime mover 2 is decreased from the predetermined value after the displacement of the hydraulic pump 3 is minimized, the difference between the determination-use rotation speed N1 and the reference rotation speed N0 when the performance of the hydraulic pump 3 has deteriorated is great, which makes it possible to improve the precision of the detection of performance deterioration of the hydraulic pump 3.

Figure 3:
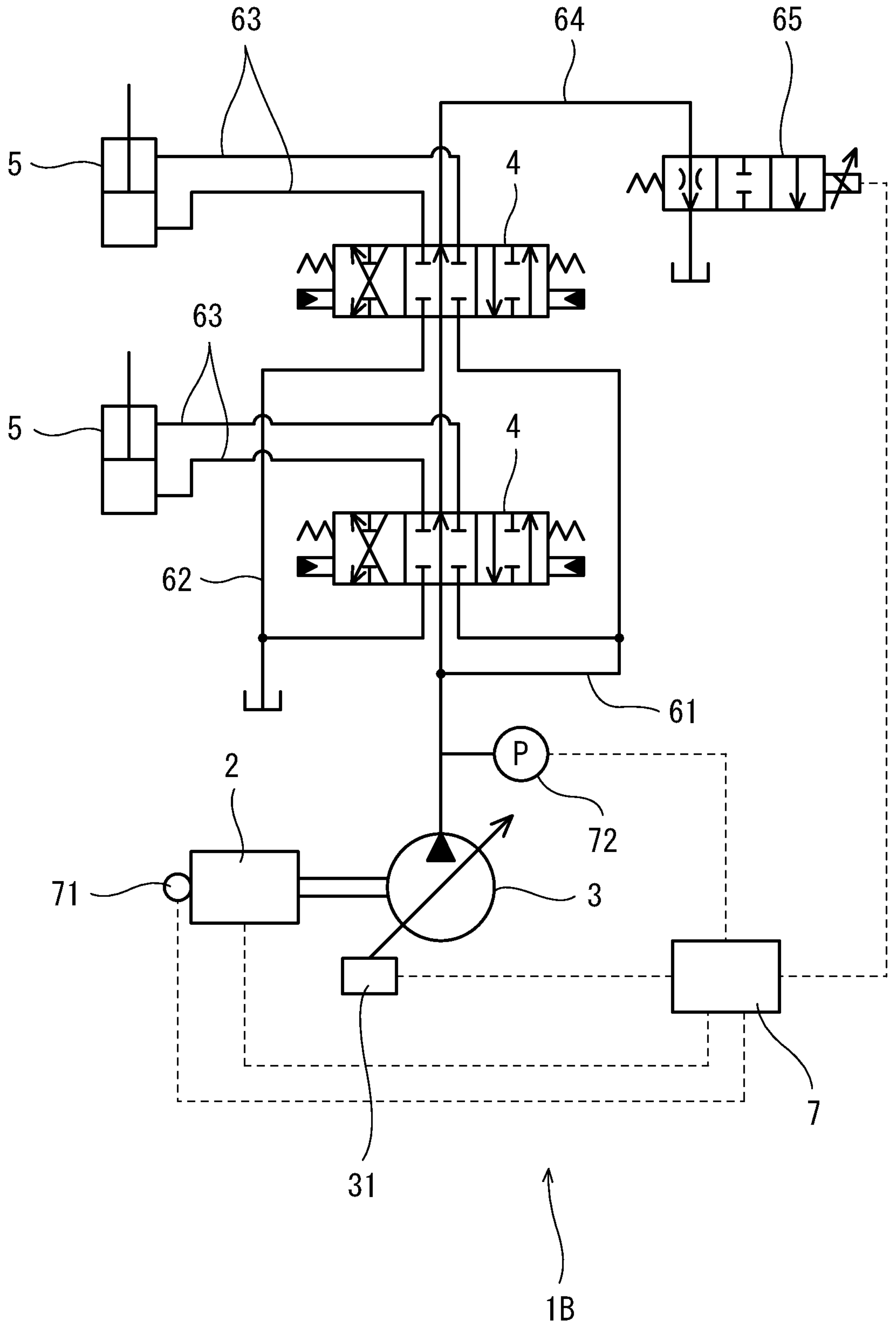
FIG. 3 is a schematic configuration diagram showing a variation of Embodiment 1.

As in a performance deterioration detection system 1B according to a variation shown in FIG. 3, the unloading valve 65 may be switchable between the open position, the closed position, and a particular restrictive position. The particular restrictive position is the position in which the opening degree of the unloading valve 65 is set to a predetermined value within the range of 1 to 70%. The opening degree of the unloading valve 65 is arbitrarily changeable within a range between the open position and its adjacent closed position.

In FIG. 3, the particular restrictive position is the neutral position, and the open position is located at the opposite side of the closed position from the particular restrictive position. That is, the particular restrictive position, which is the neutral position, is one stroke end of the spool, and the open position is the other stroke end of the spool. Alternatively, the open position may be located between the particular restrictive position and the closed position, and the particular restrictive position and the closed position may be the stroke ends. Further alternatively, either the open position or the closed position of the unloading valve 65 may be the neutral position that is one of the stroke ends, and the particular restrictive position may be the other stroke end. If the particular restrictive position is a stroke end as thus described, the reproducibility of the opening degree in the particular restrictive position can be ensured.

As shown in FIG. 3, also in a case where the unloading valve 65 is switchable to the particular restrictive position, the prime mover 2 may be an engine or an electric motor.

In the performance deterioration detection system 1B, the control circuitry 7, at the time of performing a performance check on the hydraulic pump 3, switches the unloading valve 65 to the particular restrictive position after adjusting the rotation speed of the prime mover 2 to the predetermined value Ns. Consequently, delivery of the hydraulic liquid from the hydraulic pump 3 is restricted. In this state, the control circuitry 7 increases the rotation speed of the prime mover 2 from the predetermined value Ns. Processes performed by the control circuitry 7 thereafter are the same as those described in the above embodiment.

Also in the state where the delivery of the hydraulic liquid from the hydraulic pump 3 is restricted, similar to the above-described embodiment, when the rotation speed of the prime mover 2 is relatively low, such as the predetermined value Ns, the delivery pressure of the hydraulic pump 3 does not become so high due to factors such as internal leakage of the hydraulic pump 3. In a case where the rotation speed of the prime mover 2 is increased from the relatively low predetermined value Ns, the rotation speed at which the delivery pressure of the hydraulic pump 3 becomes the threshold value Pt varies depending on the degree of an abnormality in the hydraulic pump 3. Therefore, also in the performance deterioration detection system 1B, by using the rotation speed of the prime mover 2 and the delivery pressure of the hydraulic pump 3, performance deterioration of the hydraulic pump 3 can be detected without using a flowmeter, and in addition, performance deterioration of the hydraulic pump 3 can be detected with a higher precision than in a case where the performance deterioration detection is performed by measuring a drain flow rate.

In the variation shown in FIG. 3, in order to highly precisely reproduce the performance check on the hydraulic pump 3, it is desired to take measures to make the opening area of the unloading valve 65 constant in the particular restrictive position. In this respect, if, as in the above-described embodiment, the unloading valve 65 is switchable to the closed position at the time of performing the performance check on the hydraulic pump 3, the performance check on the hydraulic pump 3 can be highly precisely reproduced without taking such measures.

Also in the variation shown in FIG. 3, the control circuitry 7 may decrease the rotation speed of the prime mover 2 from a relatively high predetermined value, and when the delivery pressure of the hydraulic pump 3 measured by the pressure sensor 72 has decreased to the threshold value Pt, the control circuitry 7 may store the rotation speed at the time as the determination-use rotation speed N1. Also in the case of decreasing the rotation speed of the prime mover 2 from the relatively high predetermined value, the rotation speed at which the delivery pressure of the hydraulic pump 3 becomes the threshold value Pt varies depending on the degree of an abnormality in the hydraulic pump 3.

In the variation shown in FIG. 3, the unloading valve 65 may be switchable only between the open position and the particular restrictive position, and the unloading passage 64 need not be blocked by the unloading valve 65. In this case, the control valves 4 also need not block the unloading passage 64, which doubles as the center bypass passage, and the unloading passage 64 may be always kept unblocked.

Figure 4:
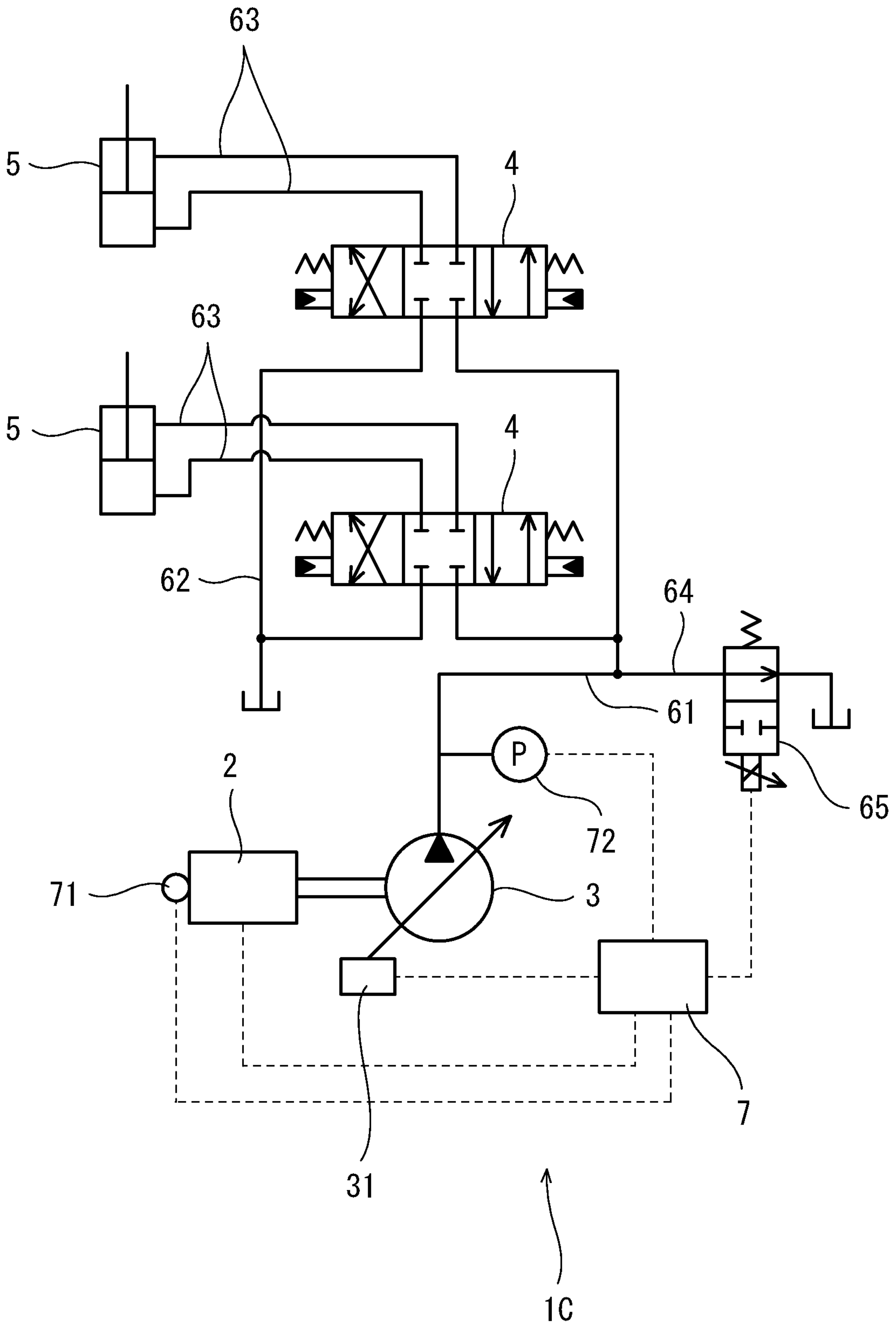
FIG. 4 is a schematic configuration diagram showing another variation of Embodiment 1.

Further, as in a performance deterioration detection system 1C according to another variation shown in FIG. 4, the unloading passage 64 need not double as the center bypass passage that passes through all the control valves 4, but may extend to the tank without passing through the control valves 4.

Embodiment 2

Figure 5:
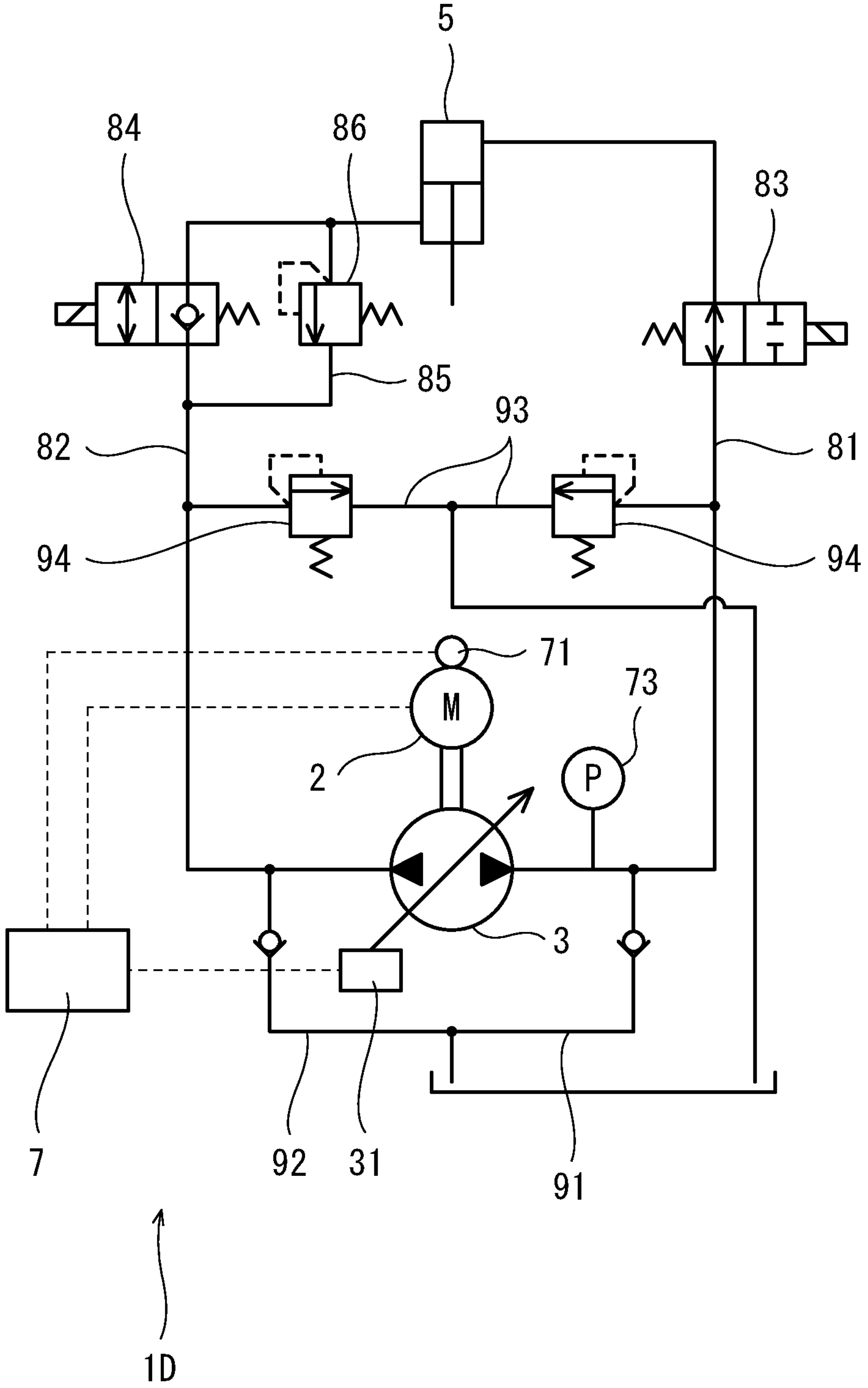
FIG. 5 shows a schematic configuration of a hydraulic pump performance deterioration detection system according to Embodiment 2.

FIG. 5 shows a hydraulic pump performance deterioration detection system 1D according to Embodiment 2. In the present embodiment, the same components as those described in Embodiment 1 are denoted by the same reference signs as those used in Embodiment 1, and repeating the same descriptions is avoided.

The present embodiment is configured so that performance deterioration of the hydraulic pump 3 can be detected, for example, with a hydraulic circuit of an industrial machine. The industrial machine is, for example, a press machine.

The hydraulic pump 3 supplies a hydraulic liquid to the hydraulic actuator 5 to move the hydraulic actuator 5. In the present embodiment, the prime mover 2, which drives the hydraulic pump 3, is an electric motor (e.g., a servomotor). Similar to Embodiment 1, the rotation speed of the prime mover 2 is measured by the rotation speed meter 71, and inputted to the control circuitry 7.

Also in the present embodiment, similar to Embodiment 1, the control circuitry 7 is configured to change the rotation speed of the prime mover 2. In a case where the prime mover 2 is a servomotor, the control circuitry 7 changes the rotation speed of the prime mover 2 via a servo amplifier.

Also in the present embodiment, similar to Embodiment 1, the hydraulic pump 3 is a variable displacement axial piston pump, the minimum displacement of which is set to be greater than zero. Similar to Embodiment 1, the displacement of the hydraulic pump 3 is arbitrarily changed by the regulator 31 within a range between the minimum displacement and the maximum displacement. Alternatively, the hydraulic pump 3 may be a two-position switching variable displacement pump, the displacement of which is selectively switchable between a first displacement and a second displacement.

Further, in the present embodiment, the hydraulic pump 3 is a bi-directional pump that is rotatable bi-directionally. Specifically, the hydraulic pump 3 includes a first port and a second port. When the hydraulic pump 3 rotates in one direction, the first port serves as a suction port, and the second port serves as a delivery port. When the hydraulic pump 3 rotates in the opposite direction, the second port serves as a suction port, and the first port serves as a delivery port.

Alternatively, the bi-directional pump may be a swash plate pump that is rotatable in a single rotation direction and whose swash plate is tiltable from the center to both sides. In this case, the prime mover 2 may be an engine.

The hydraulic pump 3, which is a bi-directional pump, is connected to the hydraulic actuator 5 by a pair of supply/discharge passages 81 and 82 in a manner to form a closed circuit. In the present embodiment, the hydraulic actuator 5 is a double-acting cylinder that extends vertically downward and retracts vertically upward. Specifically, the supply/discharge passage 81 is a head-side passage, and the supply/discharge passage 82 is a rod-side passage. At the time of extending the hydraulic actuator 5, the hydraulic liquid delivered from the hydraulic pump 3 flows through the supply/discharge passage 81, whereas at the time of retracting the hydraulic actuator 5, the hydraulic liquid delivered from the hydraulic pump 3 flows through the supply/discharge passage 82.

The supply/discharge passage 81 is connected to the tank by a replenishing passage 91, and a check valve is located on the replenishing passage 91. Similarly, the supply/discharge passage 82 is connected to the tank by a replenishing passage 92, and a check valve is located on the replenishing passage 92. Relief passages 93, on which respective relief valves 94 are located, are connected to the supply/discharge passages 81 and 82, respectively.

A speed switching valve 84 is located on the rod-side supply/discharge passage 82, and a bypass passage 85 is connected to the rod-side supply/discharge passage 82 in a manner to bypass the speed switching valve 84. A relief valve 86 is located on the bypass passage 85.

The speed switching valve 84 is in its neutral position at the time of lifting the rod and at the time of lowering the rod at low speed. When in the neutral position, the speed switching valve 84 serves as a check valve that allows a flow from the hydraulic pump 3 toward the hydraulic actuator 5, but prevents the reverse flow. That is, at the time of lowering the rod at low speed, the rod is lowered while the rod-side pressure of the hydraulic actuator 5 is kept to the setting pressure of the relief valve 86 (i.e., the relief pressure). At the time of lowering the rod at high speed, the control circuitry 7 switches the speed switching valve 84 to an open position in which the speed switching valve 84 allows flows in both directions. In FIG. 5, the illustration of part of signal lines is omitted for the purpose of simplifying the drawing.

A switching valve 83 is located on the head-side supply/discharge passage 81. The switching valve 83 is switched between an open position and a closed position. When in the open position, the switching valve 83 opens the supply/discharge passage 81. When in the closed position, the switching valve 83 blocks the supply/discharge passage 81. In the present embodiment, the open position is the neutral position. Alternatively, the closed position may be the neutral position.

Further, on the supply/discharge passage 81, a pressure sensor 73 is located between the switching valve 83 and the hydraulic pump 3. That is, at the time of extending the hydraulic actuator 5, the pressure sensor 73 measures the delivery pressure of the hydraulic pump 3 at a position upstream of the switching valve 83.

A first operation signal, which is a command to extend the hydraulic actuator 5, and a second operation signal, which is a command to retract the hydraulic actuator 5, are inputted to the control circuitry 7. The control circuitry 7 controls the electric motor, which is the prime mover 2 to drive the hydraulic pump 3, and the regulator 31 based on the first operation signal and the second operation signal.

Similar to Embodiment 1, the control circuitry 7 performs a performance check on the hydraulic pump 3 when the hydraulic actuator 5 is not moving, i.e., when the hydraulic pump 3 is not supplying the hydraulic liquid to the hydraulic actuator 5.

To be more specific, the control circuitry 7 first controls the regulator 31 to minimize the displacement of the hydraulic pump 3. Then, the control circuitry 7 switches the switching valve 83 to the closed position. Consequently, when the hydraulic pump 3 rotates in such a direction as to deliver the hydraulic liquid to the supply/discharge passage 81, the delivery of the hydraulic liquid from the hydraulic pump 3 is blocked unless the delivery pressure of the hydraulic pump 3 exceeds the setting pressure of the relief valve 94 (i.e., exceeds the relief pressure).

Thereafter, the control circuitry 7 adjusts the rotation speed of the prime mover 2 to the relatively low predetermined value Ns. The predetermined value Ns may be 0 rpm, or may be a value greater than 0 rpm (e.g., a value within the range of 1 to 200 rpm). In a case where the predetermined value Ns is greater than 0 rpm, the control circuitry 7 rotates the prime mover 2 in such a direction that the hydraulic pump 3 delivers the hydraulic liquid to the supply/discharge passage 81.

In a state where the delivery of the hydraulic liquid from the hydraulic pump 3 is blocked, when the rotation speed of the prime mover 2 is relatively low, such as the predetermined value Ns, the delivery pressure of the hydraulic pump 3 does not become so high due to factors such as internal leakage of the hydraulic pump 3.

In this state, the control circuitry 7 determines whether or not the performance of the hydraulic pump 3 has deteriorated based on the rotation speed of the prime mover 2 measured by the rotation speed meter 71 and the delivery pressure of the hydraulic pump 3 measured by the pressure sensor 72. This determination is performed in a state where the regulator 31 is, as mentioned above, controlled to minimize the displacement of the hydraulic pump 3.

To be more specific, as shown in FIG. 2, the control circuitry 7 increases the rotation speed of the prime mover 2 from the predetermined value Ns, and when the delivery pressure of the hydraulic pump 3 measured by the pressure sensor 72 has become the threshold value Pt, in other words, when the delivery pressure of the hydraulic pump 3 has increased to the threshold value Pt, the control circuitry 7 stores the rotation speed at the time as the determination-use rotation speed N1.

The control circuitry 7 prestores the reference rotation speed N0. The reference rotation speed N0 is the rotation speed obtained when the delivery pressure of the hydraulic pump 3 has become the threshold value Pt in a case where there is no abnormality in the hydraulic pump 3 (e.g., after hydraulic drive equipment including the hydraulic pump 3 is mounted to a machine and has been operated for a short period of time but before the shipment of the machine from the factory; or shortly after the fully assembled machine is shipped from the factory and after the hydraulic drive equipment has been operated only for a short period of time). The reference rotation speed N0 may be the rotation speed obtained when the delivery pressure of the hydraulic pump 3 has become the threshold value Pt in a case where a performance check is more simply performed on the hydraulic pump 3 alone.

The control circuitry 7 compares the stored determination-use rotation speed N1 with the reference rotation speed N0. In a case where the determination-use rotation speed N1 is greater than the reference rotation speed N0 by at least the setting value V ($N1-N0 \geq V$), the control circuitry 7 determines that the performance of the hydraulic pump 3 has deteriorated. On the other hand, in a case where the determination-use rotation speed N1 is not greater than the reference rotation speed N0 by at least the setting value V ($N1-N0<V$), the control circuitry 7 determines that the performance of the hydraulic pump 3 has not deteriorated.

In a case where the rotation speed of the prime mover 2 is increased from the relatively low predetermined value Ns, the rotation speed at which the delivery pressure of the hydraulic pump 3 becomes the threshold value Pt varies depending on the degree of an abnormality in the hydraulic pump 3 (e.g., in a case where the hydraulic pump 3 is a swash plate pump, examples of the abnormality therein include: wear of a shoe on the distal end of a piston, the shoe sliding on the swash plate; and wear of a sliding surface between a valve plate and a cylinder block). Therefore, by using the rotation speed of the prime mover 2 and the delivery pressure of the hydraulic pump 3 as in the present embodiment, performance deterioration of the hydraulic pump 3 can be detected without using a flowmeter, and in addition, performance deterioration of the hydraulic pump 3 can be detected with a higher precision than in a case where the performance deterioration detection is performed by measuring a drain flow rate.

Further, in the present embodiment, the rotation speed of the prime mover 2 is increased from the predetermined value Ns after the displacement of the hydraulic pump 3 is minimized. Accordingly, the difference between the determination-use rotation speed N1 and the reference rotation speed N0 when the performance of the hydraulic pump 3 has deteriorated is great, which makes it possible to improve the precision of the detection of performance deterioration of the hydraulic pump 3.

<Variations>

In the above-described embodiment, at the time of storing, as the determination-use rotation speed N1, the rotation speed of the prime mover 2 when the delivery pressure of the hydraulic pump 3 has become the threshold value Pt, the control circuitry 7 increases the rotation speed of the prime mover 2 from the relatively low predetermined value Ns. Conversely, the control circuitry 7 may decrease the rotation speed of the prime mover 2 from a relatively high predetermined value, and when the delivery pressure of the hydraulic pump 3 measured by the pressure sensor 72 has decreased to the threshold value Pt, the control circuitry 7 may store the rotation speed at the time as the determination-use rotation speed N1. Also in the case of decreasing the rotation speed of the prime mover 2 from the relatively high predetermined value, the rotation speed at which the delivery pressure of the hydraulic pump 3 becomes the threshold value Pt varies depending on the degree of an abnormality in the hydraulic pump 3. Therefore, also in this case, by using the rotation speed of the prime mover 2 and the delivery pressure of the hydraulic pump 3, performance deterioration of the hydraulic pump 3 can be detected without using a flowmeter. Further, also in the case of decreasing the rotation speed of the prime mover 2 from the relatively high predetermined value, if the rotation speed of the prime mover 2 is decreased from the predetermined value after the displacement of the hydraulic pump 3 is minimized, the difference between the determination-use rotation speed N1 and the reference rotation speed N0 when the performance of the hydraulic pump 3 has deteriorated is great, which makes it possible to improve the precision of the detection of performance deterioration of the hydraulic pump 3.

The switching valve 83 may be located not on the head-side supply/discharge passage 81, but on the rod-side supply/discharge passage 82, and at the time of performing a performance check on the hydraulic pump 3, the control circuitry 7 may rotate the prime mover 2 in such a direction that the hydraulic pump 3 delivers the hydraulic liquid to the supply/discharge passage 82. Alternatively, the switching valve 83 may be located on each of the supply/discharge passages 81 and 82.

Other Embodiments

The present disclosure is not limited to the above-described embodiments. Various modifications can be made without departing from the scope of the present disclosure.

For example, depending on the hydraulic circuit, the hydraulic pump 3 may be a fixed displacement pump.

SUMMARY

In one aspect, the present disclosure provides, as a first mode, a hydraulic pump performance deterioration detection system including: a hydraulic pump that is driven by a prime mover and that supplies a hydraulic liquid to a hydraulic actuator to move the hydraulic actuator; a switching valve located on a passage through which the hydraulic liquid delivered from the hydraulic pump flows, the switching valve being switchable between an open position in which the switching valve opens the passage and a closed position in which the switching valve blocks the passage; control circuitry configured to change a rotation speed of the prime mover; and a pressure sensor that measures a delivery pressure of the hydraulic pump at a position upstream of the switching valve. When the hydraulic actuator is not moving, in a state where the switching valve is switched to the closed position, the control circuitry determines whether or not performance of the hydraulic pump has deteriorated based on the rotation speed of the prime mover and the delivery pressure of the hydraulic pump measured by the pressure sensor.

According to the above configuration, in a state where the delivery of the hydraulic liquid from the hydraulic pump is blocked as a result of the switching valve being switched to the closed position, when the rotation speed of the prime mover is relatively low, the delivery pressure of the hydraulic pump does not become so high due to factors such as internal leakage of the hydraulic pump. In a case where the rotation speed of the prime mover is increased from a relatively low rotation speed, or decreased from a relatively high rotation speed, the rotation speed at which the delivery pressure of the hydraulic pump becomes a threshold value varies depending on the degree of an abnormality in the hydraulic pump. Therefore, by using the rotation speed of the prime mover and the delivery pressure of the hydraulic pump, performance deterioration of the hydraulic pump can be detected without using a flowmeter, and in addition, performance deterioration of the hydraulic pump can be detected with a higher precision than in a case where the performance deterioration detection is performed by measuring a drain flow rate.

In another aspect, the present disclosure provides, as a second mode, a hydraulic pump performance deterioration detection system including: a hydraulic pump that is driven by a prime mover and that supplies a hydraulic liquid to a hydraulic actuator to move the hydraulic actuator; a switching valve located on a passage through which the hydraulic liquid delivered from the hydraulic pump flows, the switching valve being switchable between an open position in which the switching valve opens the passage and a particular restrictive position in which an opening degree of the switching valve is within a range of 1 to 70%; control circuitry configured to change a rotation speed of the prime mover; and a pressure sensor that measures a delivery pressure of the hydraulic pump at a position upstream of the switching valve. When the hydraulic actuator is not moving, in a state where the switching valve is switched to the particular restrictive position, the control circuitry determines whether or not performance of the hydraulic pump has deteriorated based on the rotation speed of the prime mover and the delivery pressure of the hydraulic pump measured by the pressure sensor.

According to the above configuration, in a state where the delivery of the hydraulic liquid from the hydraulic pump is restricted as a result of the switching valve being switched to the particular restrictive position, when the rotation speed of the prime mover is relatively low, the delivery pressure of the hydraulic pump does not become so high due to factors such as internal leakage of the hydraulic pump. In a case where the rotation speed of the prime mover is increased from a relatively low rotation speed, or decreased from a relatively high rotation speed, the rotation speed at which the delivery pressure of the hydraulic pump becomes a threshold value varies depending on the degree of an abnormality in the hydraulic pump. Therefore, by using the rotation speed of the prime mover and the delivery pressure of the hydraulic pump, performance deterioration of the hydraulic pump can be detected without using a flowmeter, and in addition, performance deterioration of the hydraulic pump can be detected with a higher precision than in a case where the performance deterioration detection is performed by measuring a drain flow rate.

As a third mode, in the first mode, for example, in the state where the switching valve is switched to the closed position, the control circuitry may: change the rotation speed of the prime mover; store, as a determination-use rotation speed, the rotation speed of the prime mover when the delivery pressure of the hydraulic pump measured by the pressure sensor has become a threshold value; compare the stored determination-use rotation speed with a prestored reference rotation speed; and determine that the performance of the hydraulic pump has deteriorated in a case where the determination-use rotation speed is greater than the reference rotation speed by at least a setting value.

As a fourth mode, in the second mode, for example, in the state where the switching valve is switched to the particular restrictive position, the control circuitry may: change the rotation speed of the prime mover; store, as a determination-use rotation speed, the rotation speed of the prime mover when the delivery pressure of the hydraulic pump measured by the pressure sensor has become a threshold value; compare the stored determination-use rotation speed with a prestored reference rotation speed; and determine that the performance of the hydraulic pump has deteriorated in a case where the determination-use rotation speed is greater than the reference rotation speed by at least a setting value.

As a fifth mode, in the third or fourth mode, for example, at a time of storing, as the determination-use rotation speed, the rotation speed of the prime mover when the delivery pressure of the hydraulic pump measured by the pressure sensor has become the threshold value, the control circuitry may increase the rotation speed of the prime mover from a predetermined value.

As a sixth mode, in any of the third to fifth modes, the hydraulic pump may be a variable displacement pump whose minimum displacement is set to be greater than zero. The hydraulic pump performance deterioration detection system may further include a regulator that changes the displacement of the hydraulic pump and that is controlled by the control circuitry. In a state where the control circuitry is controlling the regulator to minimize the displacement of the hydraulic pump, the control circuitry may perform the determination on whether or not the performance of the hydraulic pump has deteriorated. According to this configuration, the difference between the determination-use rotation speed and the reference rotation speed when the performance of the hydraulic pump has deteriorated is great, which makes it possible to improve the precision of the detection of performance deterioration of the hydraulic pump.

As a seventh mode, in any of the first, third, fifth, and sixth modes, the hydraulic pump may supply the hydraulic liquid to the hydraulic actuator via a control valve. The passage may be an unloading passage branched off from a supply passage that connects the hydraulic pump to the control valve. The switching valve may be an unloading valve whose opening degree is arbitrarily changeable within a range between the open position and the closed position. According to this configuration, performance deterioration of the hydraulic pump can be detected, for example, with a hydraulic circuit of a construction machine. In addition, it is often the case that a hydraulic circuit of a construction machine includes: the unloading passage, on which the unloading valve is located; and the pressure sensor, which measures the delivery pressure of the hydraulic pump. Such a hydraulic circuit makes it possible to detect performance deterioration of the hydraulic pump without requiring additional device installation.

As an eighth mode, in any of the second and fourth to sixth modes, the hydraulic pump may supply the hydraulic liquid to the hydraulic actuator via a control valve. The passage may be an unloading passage branched off from a supply passage that connects the hydraulic pump to the control valve. The switching valve may be an unloading valve whose opening degree is arbitrarily changeable within a range between the open position and a closed position in which the unloading valve blocks the unloading passage. According to this configuration, the same advantageous effects as those obtained by the sixth mode can be obtained.

As a ninth mode, in the eighth mode, the unloading valve may be a spool valve that includes a spool therein. Either one of the open position or the closed position, and the particular restrictive position, may be stroke ends of the spool, respectively. According to this configuration, the reproducibility of the opening degree in the particular restrictive position can be ensured.

As a tenth mode, in any of the first and third to seventh modes, the hydraulic pump may be a bi-directional pump that is connected to the hydraulic actuator by a pair of supply/discharge passages in a manner to form a closed circuit. The passage may be at least one of the pair of supply/discharge passages. According to this configuration, performance deterioration of the hydraulic pump can be detected, for example, with a hydraulic circuit of an industrial machine.

As an eleventh mode, in any of the first to tenth modes, for example, the hydraulic pump may be an axial piston pump.

What is claimed is:

1. A hydraulic pump performance deterioration detection system comprising:

a hydraulic pump that is driven by a prime mover and that supplies a hydraulic liquid to a hydraulic actuator to move the hydraulic actuator;

a switching valve located on a passage through which the hydraulic liquid delivered from the hydraulic pump flows, the switching valve being switchable between an open position in which the switching valve opens the passage and a closed position in which the switching valve blocks the passage;

control circuitry, including a hardware processor, configured to change a rotation speed of the prime mover; and a pressure sensor that measures a delivery pressure of the hydraulic pump at a position upstream of the switching valve, wherein the control circuitry switches the switching valve to the closed position, when the hydraulic actuator is not moving, in a state where the switching valve is switched to the closed position, the control circuitry determines whether or not performance of the hydraulic pump has deteriorated based on the rotation speed of the prime mover and the delivery pressure of the hydraulic pump measured by the pressure sensor, and in the state where the switching valve is switched to the closed position, the control circuitry:

changes the rotation speed of the prime mover, stores, as a determination-use rotation speed, the rotation speed of the prime mover when the delivery pressure of the hydraulic pump measured by the pressure sensor has become a threshold value, compares the stored determination-use rotation speed with a prestored reference rotation speed, and determines that the performance of the hydraulic pump has deteriorated in a case where the determination-use rotation speed is greater than the reference rotation speed by at least a setting value.

2. The hydraulic pump performance deterioration detection system according to claim 1, wherein when the control circuitry stores, as the determination-use rotation speed, the rotation speed of the prime mover when the delivery pressure of the hydraulic pump measured by the pressure sensor has become the threshold value, the control circuitry increases the rotation speed of the prime mover from a predetermined value, the predetermined value being different from the determination-use rotation speed.

3. The hydraulic pump performance deterioration detection system according to claim 2, wherein the hydraulic pump is a variable displacement pump whose minimum displacement is set to be greater than zero, the hydraulic pump performance deterioration detection system further comprises a regulator that changes the displacement of the hydraulic pump and that is controlled by the control circuitry, and in a state where the control circuitry is controlling the regulator to minimize the displacement of the hydraulic pump, the control circuitry performs the determination on whether or not the performance of the hydraulic pump has deteriorated.

4. The hydraulic pump performance deterioration detection system according to claim 1, wherein the hydraulic pump is a variable displacement pump whose minimum displacement is set to be greater than zero, the hydraulic pump performance deterioration detection system further comprises a regulator that changes the displacement of the hydraulic pump and that is controlled by the control circuitry, and when the hydraulic actuator is not moving, in a state where the switching valve is switched to the closed position and the control circuitry is controlling the regulator to minimize the displacement of the hydraulic pump, the control circuitry determines whether or not the performance of the hydraulic pump has deteriorated based on the rotation speed of the prime mover and the delivery pressure of the hydraulic pump measured by the pressure sensor.

5. The hydraulic pump performance deterioration detection system according to claim 1, wherein the hydraulic pump supplies the hydraulic liquid to the hydraulic actuator via a control valve, the passage is an unloading passage branched off from a supply passage that connects the hydraulic pump to the control valve, and the switching valve is an unloading valve whose opening degree is arbitrarily changeable within a range between the open position and the closed position.

6. The hydraulic pump performance deterioration detection system according to claim 1, wherein the hydraulic pump is a bi-directional pump that is connected to the hydraulic actuator by a pair of supply/discharge passages in a manner to form a closed circuit, and the passage is at least one of the pair of supply/discharge passages.

7. The hydraulic pump performance deterioration detection system according to claim 1, wherein the hydraulic pump is an axial piston pump.

8. A hydraulic pump performance deterioration detection system comprising:

a hydraulic pump that is driven by a prime mover and that supplies a hydraulic liquid to a hydraulic actuator to move the hydraulic actuator;

a switching valve located on a passage through which the hydraulic liquid delivered from the hydraulic pump flows, the switching valve being switchable between an open position in which the switching valve opens the passage and a particular restrictive position in which an opening degree of the switching valve is within a range of 1 to 70%;

control circuitry, including a hardware processor, configured to change a rotation speed of the prime mover; and a pressure sensor that measures a delivery pressure of the hydraulic pump at a position upstream of the switching valve, wherein the control circuitry switches the switching valve to the particular restrictive position, when the hydraulic actuator is not moving, in a state where the switching valve is switched to the particular restrictive position, the control circuitry determines whether or not performance of the hydraulic pump has deteriorated based on the rotation speed of the prime mover and the delivery pressure of the hydraulic pump measured by the pressure sensor, and in the state where the switching valve is switched to the particular restrictive position, the control circuitry:

changes the rotation speed of the prime mover, stores, as a determination-use rotation speed, the rotation speed of the prime mover when the delivery pressure of the hydraulic pump measured by the pressure sensor has become a threshold value, compares the stored determination-use rotation speed with a prestored reference rotation speed, and determines that the performance of the hydraulic pump has deteriorated in a case where the determination-use rotation speed is greater than the reference rotation speed by at least a setting value.

9. The hydraulic pump performance deterioration detection system according to claim 8, wherein when the control circuitry stores, as the determination-use rotation speed, the rotation speed of the prime mover when the delivery pressure of the hydraulic pump measured by the pressure sensor has become the threshold value, the control circuitry increases the rotation speed of the prime mover from a predetermined value, the predetermined value being different from the determination-use rotation speed.

10. The hydraulic pump performance deterioration detection system according to claim 8, wherein the hydraulic pump is a variable displacement pump whose minimum displacement is set to be greater than zero, the hydraulic pump performance deterioration detection system further comprises a regulator that changes the displacement of the hydraulic pump and that is controlled by the control circuitry, and when the hydraulic actuator is not moving, in a state where the switching valve is switched to the particular restrictive position and the control circuitry is controlling the regulator to minimize the displacement of the hydraulic pump, the control circuitry determines whether or not the performance of the hydraulic pump has deteriorated based on the rotation speed of the prime mover and the delivery pressure of the hydraulic pump measured by the pressure sensor.

11. The hydraulic pump performance deterioration detection system according to claim 8, wherein the hydraulic pump supplies the hydraulic liquid to the hydraulic actuator via a control valve, the passage is an unloading passage branched off from a supply passage that connects the hydraulic pump to the control valve, the switching valve is an unloading valve whose opening degree is arbitrarily changeable within a range of 0 to 100%, and the opening degree of the switching valve in the open position is 100%, the opening degree of the switching valve in a closed position is 0%, and the closed position is a position in which the switching valve, which is the unloading valve, blocks the unloading passage.

12. The hydraulic pump performance deterioration detection system according to claim 11, wherein the unloading valve is a spool valve that includes a spool therein, and either one of the open position or the closed position, and the particular restrictive position, are stroke ends of the spool, respectively.

13. The hydraulic pump performance deterioration detection system according to claim 8, wherein the hydraulic pump is an axial piston pump.

14. A hydraulic pump performance deterioration detection system comprising:

a hydraulic pump that is driven by a prime mover and that supplies a hydraulic liquid to a hydraulic actuator to move the hydraulic actuator;

a switching valve located on a passage through which the hydraulic liquid delivered from the hydraulic pump flows, the switching valve being switchable between an open position in which the switching valve opens the passage and a particular restrictive position in which an opening degree of the switching valve is within a range of 1 to 70%, the opening degree of the switching valve in the particular restrictive position being a predetermined value;

control circuitry, including a hardware processor, configured to change a rotation speed of the prime mover; and a pressure sensor that measures a delivery pressure of the hydraulic pump at a position upstream of the switching valve, wherein the control circuitry switches the switching valve to the particular restrictive position, when the hydraulic actuator is not moving, in a state where the switching valve is switched to the particular restrictive position, the control circuitry determines whether or not performance of the hydraulic pump has deteriorated based on the rotation speed of the prime mover and the delivery pressure of the hydraulic pump measured by the pressure sensor, the hydraulic pump supplies the hydraulic liquid to the hydraulic actuator via a control valve, the passage is an unloading passage branched off from a supply passage that connects the hydraulic pump to the control valve, the switching valve is an unloading valve whose opening degree is arbitrarily changeable within a range of 0 to 100%, and the opening degree of the switching valve in the open position is 100%, the opening degree of the switching valve in a closed position is 0%, and the closed position is a position in which the switching valve, which is the unloading valve, blocks the unloading passage.

* * * * *